INVENTORS
BYRON F. BURCH, JR.
MYLES E. WOOD
BY William C. Cahill

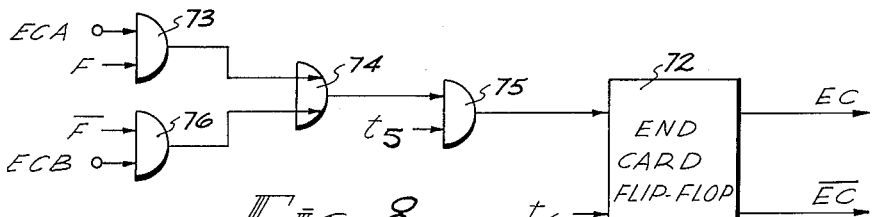
Fig. 8
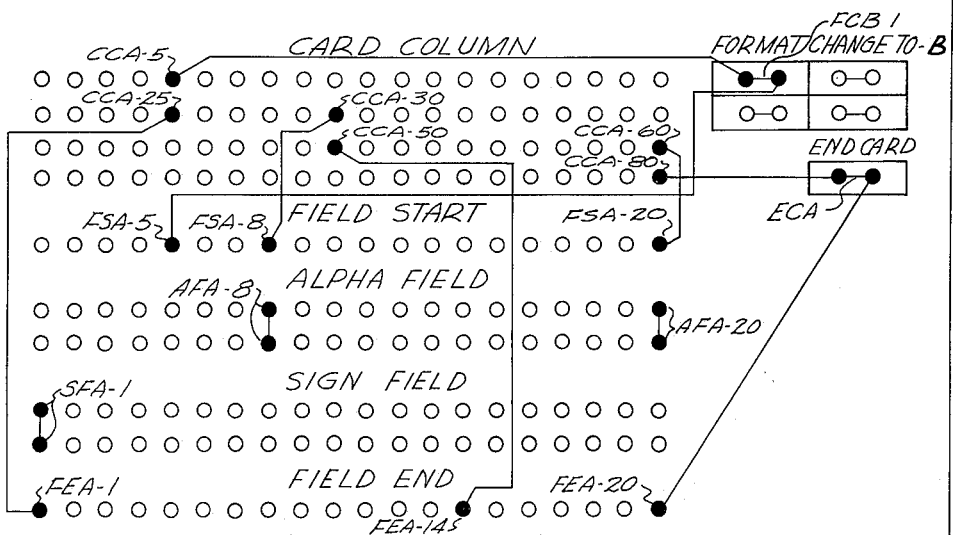
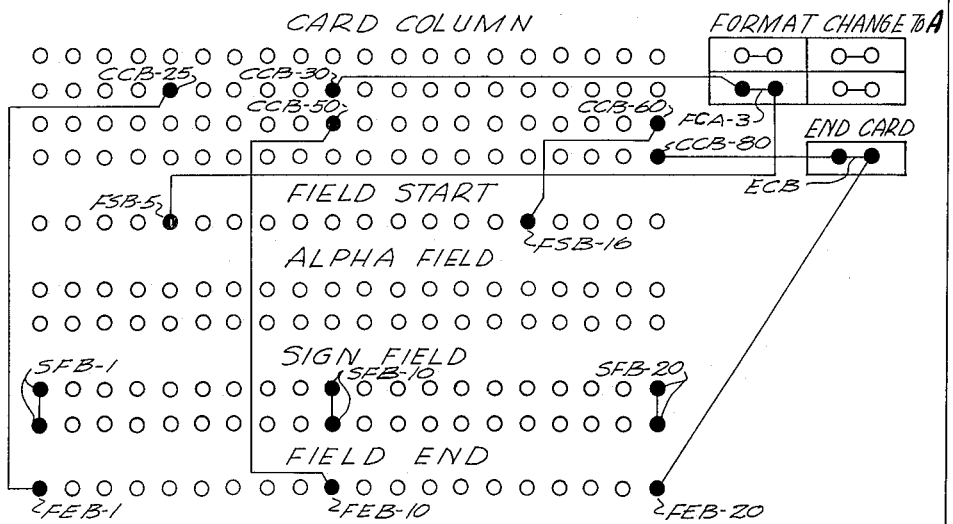
Fig. 9

United States Patent Office 3,248,522
Patented Apr. 26, 1966

3,248,522
INFORMATION READING SYSTEM
Byron F. Burch, Jr., Phoenix, Ariz., and Myles E. Wood, Norristown, Pa., assignors to General Electric Company, a corporation of New York
Filed Feb. 23, 1962, Ser. No. 175,166
9 Claims. (Cl. 235—61.11)

This invention relates to a system for reading information from an information bearing medium.

In the high speed electronic data processing systems which are in widespread use today, it is necessary that the information to be processed by the system be supplied from an external source of information and that the output of the system be placed in some usable form for future operations or reference. The input information to such systems is usually provided in some form of information bearing medium, and the data processing system includes suitable apparatus for reading the information from the medium and for converting it into a suitable form, such as electrical signals, which can be utilized by the system. Examples of such an information bearing medium are magnetic tape, thermoplastic recording tape, documents bearing magnetic ink imprintations and punched cards.

The standard Hollerith punched card for storing information contains eighty vertical columns in which information is stored in the form of punched holes selectively spaced in the columns. Each column contains twelve possible locations at which a hole may be punched. The resultant card thus contains eighty vertical columns and twelve horizontal rows and a hole may be punched at the intersection of any column and row. The columns are customarily consecutively numbered, one through eighty, beginning at the leading edge of the card and the rows are customarily numbered, reading from top to bottom as follows: 12, 11, 0, 1, 2, 3, 4, 5, 6, 7, 8, 9.

The information stored in the punched card may be represented in any arbitrary code, with any arbitrary combination of holes punched in a given column representing any desired symbol such as a numerical or alphabetical character or other arbitrary symbol. It is only necessary to provide suitable decoding logic to recognize an arbitrary combination of punched holes to represent a specific symbol.

The holes punched in each column in the punched card thereby represent a discrete symbol, such as a numeral or a letter. However, to be meaningful, this symbol must usually be considered in association with adjacent symbols. For example, the symbol may be only one numeral or a number comprising several numerals or only one letter of a word and it its thus necessary to read the adjacent columns also to obtain fully the information from the punched card. These adjacent columns which together comprise a useful portion of information may be referred to as a field of information, with such a field of information comprising any desired number of adjacent columns up to eighty columns, which is the capacity of the conventional card. It is thus desirable to provide in the reading system some means for recognizing the beginning and end of each field of information.

It is also desirable sometimes to be able to represent information on a punched card in more than one arbitrary code and to have the information reading system recognize the code being employed to represent information and properly to decode the punched holes into the desired symbols. For example, it is sometimes desirable to provide one code employing the fewest possible punched holes to represent strictly numerical information and to provide another code which of necessity must require more punched holes to represent information which may include both alphabetical and numerical characters, as well as other arbitrary characters. Such codes may be called numeric codes and alphanumeric codes, respectively.

When a numeric code such as was discussed in the previous paragraph is employed, the information stored in a field of information represents a number which may have either a positive or negative algebraic sign. It is desirable to provide some means for recognizing the algebraic sign of the number without employing additional columns to indicate this algebraic sign.

In reading information from a punched card, it must first be determined in what manner the information on the card is to be read. For example, it must be determined which of the fields of information are to be read and which of the possible codes are to be employed in each field of information. This predetermined manner of reading the card may be referred to as the format for reading the card. It is sometimes desirable to provide more than one such predetermined format for each card, with the format selected for each card being determined by information contained in each punched card. For example, it may be desirable to read several fields of information from all cards containing predetermined information in a predetermined field of information but to not read any further information from those punched cards which do not contain this predetermined information in the predetermined field of information. Under such conditions, it is desirable to follow a first format for reading those cards which contain the predetermined information in the predetermined field of information and to follow a second format for those punched cards which do not contain the predetermined information in the predetermined field of information.

It is accordingly an object of this invention to provide an improved system for reading information from an information bearing medium.

It is another object of this invention to provide a system for reading information from an information bearing medium which recognizes the desired fields of information to be read from the medium.

It is another object of this invention to provide a system for reading information from an information bearing medium in which any predetermined one of a plurality of codes may be used and which recognizes the predetermined code being used in each field of information.

It is yet another object of this invention to provide an improved system for reading information from information bearing medium which recognizes the algebraic sign of a number being read from the medium.

It is yet another object of this invention to provide a system for reading information from an information bearing medium which may read the information from the medium in a predetermined one of a plurality of formats in response to information contained in a medium.

Briefly stated, and in accordance with one embodiment of the present invention, a system for reading information contained in an information bearing medium in which the information contained in the medium is arbitrarily separable into any selected number of fields of information is provided with first selective means for indicating the beginning of predetermined fields of information, second selective means for indicating the end of each of the predetermined fields of information and further means responsive to the first and second selective means for reading from the information bearing medium only that information contained in the predetermined fields of information.

For a complete understanding of the invention, together with other objects and advantages thereof, reference may be had to the accompanying drawings, in which:

FIGURES 3 through 8 show schematic diagrams of circuits which may be used to implement the present invention; and FIGURE 9 shows a plugboard such as shown in FIGURE 2 which is connected to control the reading operation of the punched cards in an illustrative predetermined manner.

The invention is disclosed and illustrated in connection with a system for reading a conventional Hollerith punched card, although it is understood that the invention may equally well be used to read information from punched cards having any desired number of columns and rows in which information can be stored and may also be applicable to systems for reading information containing other forms of information bearing medium, such as documents having magnetic ink imprintations, thermoplastic recording tape or magnetic recording tape.

Figure 1:
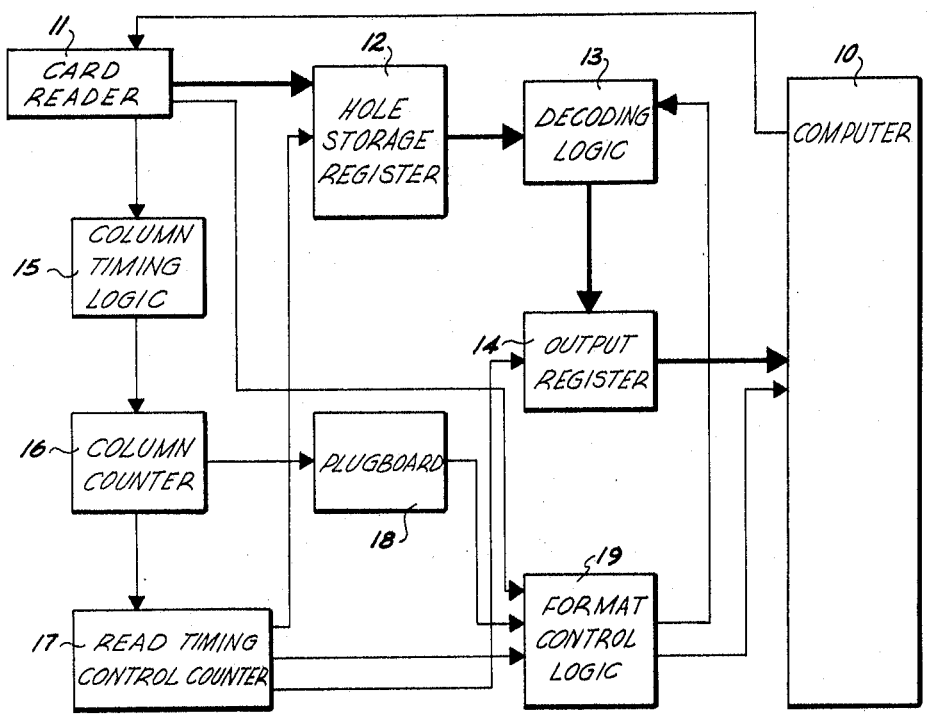
FIGURE 1 shows, in block diagram form, an information reading system embodying the present invention for reading information from punched cards.

FIGURE 1 shows a block diagram of an information reading system embodying the present invention. In this system, a Computer 10 receives information from a plurality of punched cards, which are read by a serial Card Reader 11. In the block diagram, the heavy flow lines represent the flow of information from the punched cards to the Computer and the light flow lines represent the connections of control signals between the various components of the system.

Card Reader 11 may be any of the serial card readers which are well known to those skilled in the art. In one such card reader, the punched cards to be read are serially moved between a light source and a bank of photocells and the columns are consecutively or serially read as they pass between the light and photocells. In another such card reader, all holes are sensed simultaneously and a commutator serially scans all columns to obtain a serial signal. Electrical signals indicating the presence or absence of a punched hole in each row of the card being read are applied to a Hole Storage Register 12, which register provides suitable signals to Decoding Logic 13, which decodes the signals according to the particular arbitrary code being used. The output of Decoding Logic 13 is applied to an Output Register 14, which supplies signals to the Computer 10 in a form suitable for use in the Computer 10 and which correspond to the information contained in the punched cards read by serial Card Reader 11. The information supplied to the Computer 10 may be stored in the memory of the Computer 10 or may be immediately used by the Computer, whichever is desired.

Card Reader 11 also supplies control signals to Column Timing Logic 15 which indicate that a column is being read by Card Reader 11. Column timing logic 15 provides signals to a Column Counter 16 which keeps track of the columns being read and indicates which column is presently being read. For example, in an eighty column card reader such as is being described, Column Counter 16 could take the form of an eighty count ring counter, with each position in the ring counter corresponding to a respective column on the card. Alternatively, Column Counter 16 could be any form of counter capable of counting to eighty, such as a two unit binary coded decimal counter.

Column Counter 16 provides a signal to Read Timing Control Counter 17 indicating a column is being read. Read Timing Control Counter 17, which may conveniently take the form of a three stage binary counter capable of eight separate column timing signals, provides eight successive timing signals during the reading of each column of information on the punched card, with these timing signals being conveniently designated as: $t_0, t_1, t_2, t_3, t_4, t_5, t_6,$ and $t_7$ These signals provide the timing signals which control the Hole Storage Register 12, Output Register 14 and Format Control Logic 19, as will be later described.

Column Counter 16 also provides a signal to Plugboard 18 indicating which of the eighty columns is being read at any moment by Card Reader 11. The structure and function of Plugboard 18 will be later described in detail.

Format Control Logic 19, under the selective control of Plugboard 18 and the timing pulses from Read Timing Control Counter 17, provides signals to Decoding Logic 13 indicating in which of the possible codes the information being read is represented and also provides control signals to Computer 10 indicating when information is to be read, the code being employed and the algebraic sign of the information being read.

Figure 2:
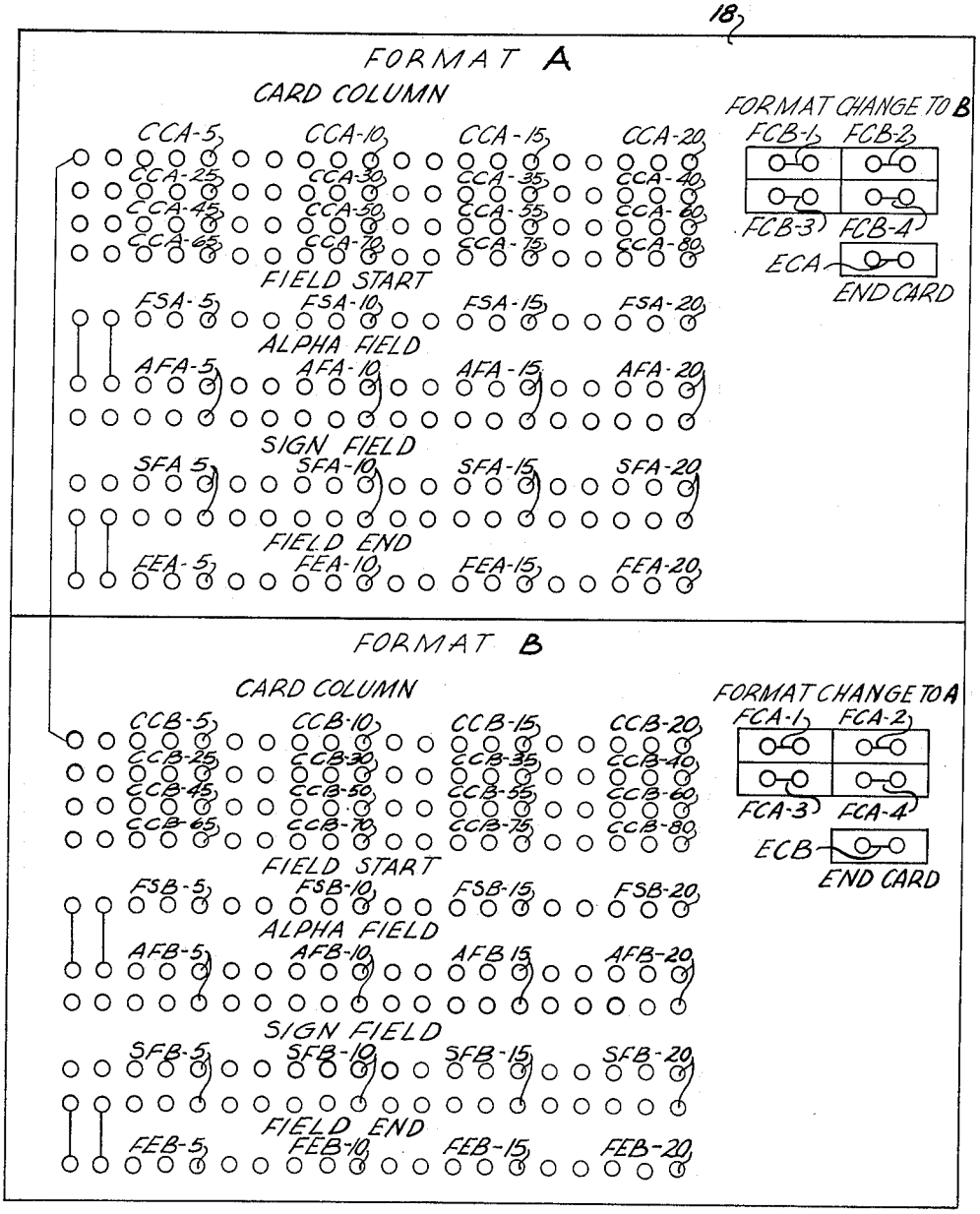
FIGURE 2 shows a plugboard which may be used in the system shown in FIGURE 1.

FIGURE 2 shows a detailed view of Plugboard 18 of FIGURE 1. It is observed that Plugboard 18 consists of two identical portions, which are labelled Format A and Format B. Format A will be described in detail, it being observed that Format B is identical to Format A with the exception that the individual hubs of Format B contain the letter B in their designation rather than the letter A.

Format A consists of eighty "Card Column" hubs, twenty "Field Start" hubs, twenty pairs of "Alpha Field" hubs, twenty pairs of "Sign Field" hubs, twenty "Field End" hubs, four pairs of "Format Change to B" hubs, and one pair of "End Card" hubs. In each set of hubs, every fifth hub is numbered, it being understood that the unnumbered hubs are successively numbered in the same manner, but these numbers are omitted for clarity.

Each of the eighty "Card Column" hubs corresponds to a respective one of the columns of the punched card being read by Card Reader 11. Each "Card Column" hub receives a signal from Column Counter 16 when its respective column is being read by Card Reader 11. Thus, hub CCA-5 receives a signal when the fifth column of a card is being read, hub CCA-30 receives a signal when the thirtieth column of the card is being read, etc.

The internal electrical connections of the Plugboard 18 are as follows: Each "Card Column" hub in Format A is electrically connected to the corresponding "Card Column" hub in Format B. Thus, as is shown in FIGURE 2, hub CCA-1 is connected to hub CCB-1. In a similar manner, all other "Card Column" hubs are respectively connected, but these other connections are not shown in FIGURE 2 for clarity. Each "Field Start" hub is connected to the upper one of the corresponding pair of "Alpha Field" hubs. Thus, hub FSA-1 is shown connected to the upper hub AFA-1, hub FSA-2 is shown connected to the upper hub AFA-2, hub FSB-1 is shown connected to the upper hub AFB-1 and hub FSB-2 is shown connected to the upper hub AFB-2. In a similar manner, all "Field Start" hubs are connected to a corresponding "Alpha Field" hub, but the others are again not shown for clarity. Each "Field End" hub is connected to the lower one of the corresponding pair of "Sign Field" hubs; thus, hub FEA-1 is connected to the lower hub SFA-1, hub FEA-2 is connected to the lower hub SFA-2, hub FEB-1 is connected to the lower hub SFB-1 and hub FEB-2 is connected to the lower hub SFB-2. Again, in a similar manner, all "Field End" and "Sign Field" hubs are respectively connected, but are again not shown for clarity. Each associated pair of "Format Change" hubs are electrically connected together, as is shown in each case, and each pair of "End Card" hubs is electrically connected together, again as is shown in the drawing.

The operation of the plugboard will first be described functionally and later logic circuits implementing these functions will be described, these circuits being shown in FIGURES 3 through 8.

An operator first determines what format is to control the reading of the punched cards by Card Reader 11; that is, the operator decides which fields of information are to be read, the code to be employed in each field, whether or not to sample the algebraic sign of the information, etc., and then selectively connects Plugboard 18 according to predetermined rates to effect the desired reading operation. The operator first determines what fields of information are to be read from the punched card. Each "Card Column" hub corresponding to the first column in each selected field of information is electrically connected to one of the "Field Start" hubs by a jumper wire (not shown). For example, should it be desired to read a field of information beginning with the fifth column of the punched card, hub CCA–5 is connected to any one of the FSA hubs. Each "Card Column" hub corresponding to the final column in each selected field of information is connected to one of the "Field End" hubs. Thus, if the field of information beginning with column five should end at column ten, hub CCA–10 is connected through a jumper wire (again not shown) to any one of the FEA hubs. The operator next determines whether each field of information is to be read in a numeric code or a alphanumeric code. The following table shows two arbitrary codes which may be used to represent numeric information and alphanumeric information, respectively:

| Hollerith Code | Numeric Code | Alpha-numeric Code |
| --- | --- | --- |
| 0 | 0 | 0 |
| 1 | 1 | 1 |
| 2 | 2 | 2 |
| 3 | 3 | 3 |
| 4 | 4 | 4 |
| 5 | 5 | 5 |
| 6 | 6 | 6 |
| 7 | 7 | 7 |
| 8 | 8 | 8 |
| 9 | 9 | 9 |
| 12–1 | | A |
| 12–2 | | B |
| 12–3 | | C |
| 12–4 | | D |
| 12–5 | | E |
| 12–6 | | F |
| 12–7 | | G |
| 12–8 | | H |
| 12–9 | | I |
| 11–1 | | J |
| 11–2 | | K |
| 11–3 | | L |
| 11–4 | | M |
| 11–5 | | N |
| 11–6 | | O |
| 11–7 | | P |
| 11–8 | | Q |
| 11–9 | | R |
| 0–2 | | S |
| 0–3 | | T |
| 0–4 | | U |
| 0–5 | | V |
| 0–6 | | W |
| 0–7 | | X |
| 0–8 | | Y |
| 0–9 | | Z |

If desired, additional arbitrary hole combinations can represent other symbols, such as punctuation marks.

If the respective field of information is to be read in the numeric code, the operator makes no connection on the plugboard and the field of information is automatically read in numeric code. However, if it is desired to read the field of information in the alphanumeric code, the operator connects together the pair of "Alpha Field" hubs associated with the "Field Start" hub used at the beginning of the field of information. Thus, should the operator have selected hub FSA–1 to connect to hub CCA–5 to indicate the beginning of a field of information, the operator connects together through a jumper wire (not shown in this figure) the pair of hubs AFA–1 to indicate the alphanumeric code is used. If the field of information corresponding to columns five through ten is to be read in the numeric code, the operator may connect together the pair of "Sign Field" hubs associated with the "Field End" hub to which hub CCA–10 is connected if it is also desired to sample the algebraic sign of the number. Thus, if hub CCA–10 is connected to hub FEA–1, the operator connects together the pair of hubs SFA–1. If a punched hole then appears in row eleven of column ten, the information contained in the field is read with a negative algebraic sign. If no punched hole appears in row eleven of column ten, the information is read with a positive algebraic sign.

The operator connects the "Card Column" hub corresponding to the final column of the final field of information to be read to a "Field End" hub through the pair of "End Card" hubs. Thus, the operator connects the "Card Column" hub corresponding to this final column to one of the "End Card" hubs and connects the other "End Card" hub to any one of the "Field End" hubs.

Format B of Plugboard 18 may be connected in a similar manner to read the punched cards in a different format, if desired. When the operator desires to change from Format A to Format B, he connects a "Card Column" hub corresponding to the first column in a field of information to be read to one of the "Format Change to B" hubs. He then connects the hub associated with the selected "Format Change to B" hub to any one of the "Field Start" hubs in Format A. If a punched hole appears in the twelfth row of the column corresponding to the "Card Column" hub so connected, the reading operation is transferred to the control of Format B. If no punched hole appears in the twelfth row of this column, the reading operation continues under the control of Format A.

FIGURES 3 through 8 show schematic diagrams of logic circuits which may be used to effect the functional operations described in connection with the description of Plugboard 18 of FIGURE 2. These logic circuits are generally indicated as being the Format Control Logic 19 of the block diagram of FIGURE 1.

Figure 3:
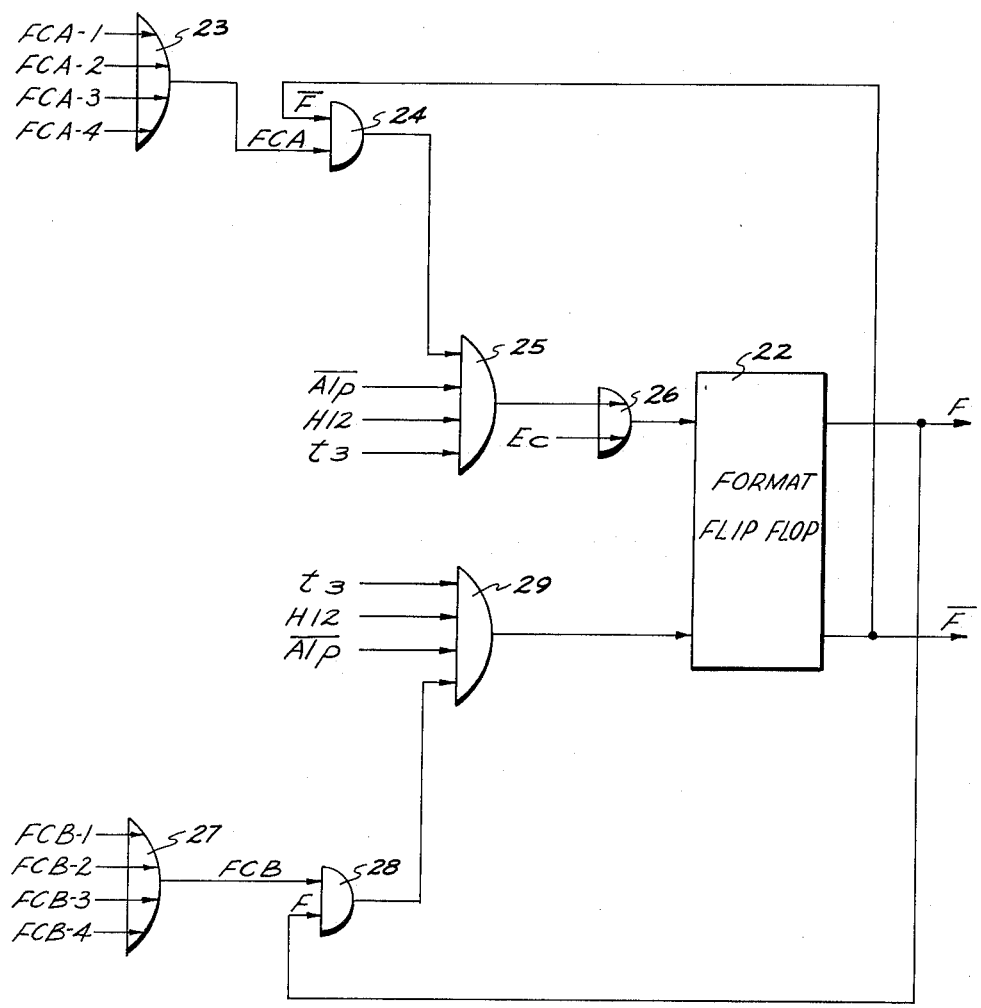

FIGURE 3 shows a schematic diagram for a logic circuit used to control Format flip-flop 22, which determines whether Format A or Format B of Plugboard 18 of FIGURE 2 controls the reading operation of a particular punched card. When Format flip-flop 22 is in its set condition, it provides a true output signal F which enables Format A to control the reading operation. When Format flip-flop 22 is in its reset condition, it provides a false output signal $\overline{F}$ which enables Format B to control the reading operation. Format flip-flop 22 may be any suitable bi-stable flip-flop element capable of retaining either of two stable conditions.

The control of flip-flop 22 is as follows: Assume the flip-flop is in its reset condition and the false signal $\overline{F}$ exists. OR-logic gate 23 has four input terminals, FCA–1, FCA–2, FCA–3, and FCA–4, with these signals receiving their input signals from the "Format Change to A" hubs of the Format B half of Plugboard 18 of FIGURE 2. If any of the "Card Column" hubs of Format B are connected to any of the FCA hubs, the presence of the corresponding column of the punched card under the reading station of Card Reader 11 causes a signal to occur at this FCA hub and provides a signal FCA to one of the input terminals of AND-logic gate 24. The other input terminal of AND-logic gate 24 receives the signal $\overline{F}$ from flip-flop 22 and thus the FCA signal is passed to AND-logic gate 25. The other inputs to AND-logic gate 25 are $\overline{A1p}$, whose derivation will be discussed in connection with FIGURE 6, H12, which indicates that a hole exists in the twelfth row of the column being read, and $t_3$, which is obtained from Read Timing Control Counter 17 of FIGURE 1. Upon the simultaneous occurrence of these four signals, AND-logic gate 25 passes a signal to OR-logic gate 26, which sets Format flip-flop 22 and provides the true output signals F therefrom, thereby enabling Format A to obtain control of the reading operation of the punched card.

The other input to OR-logic gate 26 is the signal Ec, whose derivation is described in FIGURE 8. This signal indicates that the final field of information from a given card has been read. Format flip-flop 22 is set by this signal so Format A always controls the reading operation at the beginning of the next card.

Format flip-flop 22 is reset in the following manner: The occurrence of a signal at any of the FCB hubs of the Format A half of the Plugboard 18 causes an output signal FCB from OR-logic gate 27, which is passed to the previously enabled AND-logic gate 28. The simultaneous occurrence of a signal FCB, $\overline{Alp}$, H12 and $t_3$ enables AND logic gate 29 to reset Format flip-flop 22, once again returning control over the reading operation to Format B of Plugboard 18.

The state of Format flip-flop 22 may thus be represented by the following logic equations:

$$F = FCA \cdot \overline{Alp} \cdot H12 \cdot t_3 \cdot \overline{F} + Ec$$
$$\overline{F} = FCB \cdot \overline{Alp} \cdot H12 \cdot t_3 \cdot F$$

Figure 4:
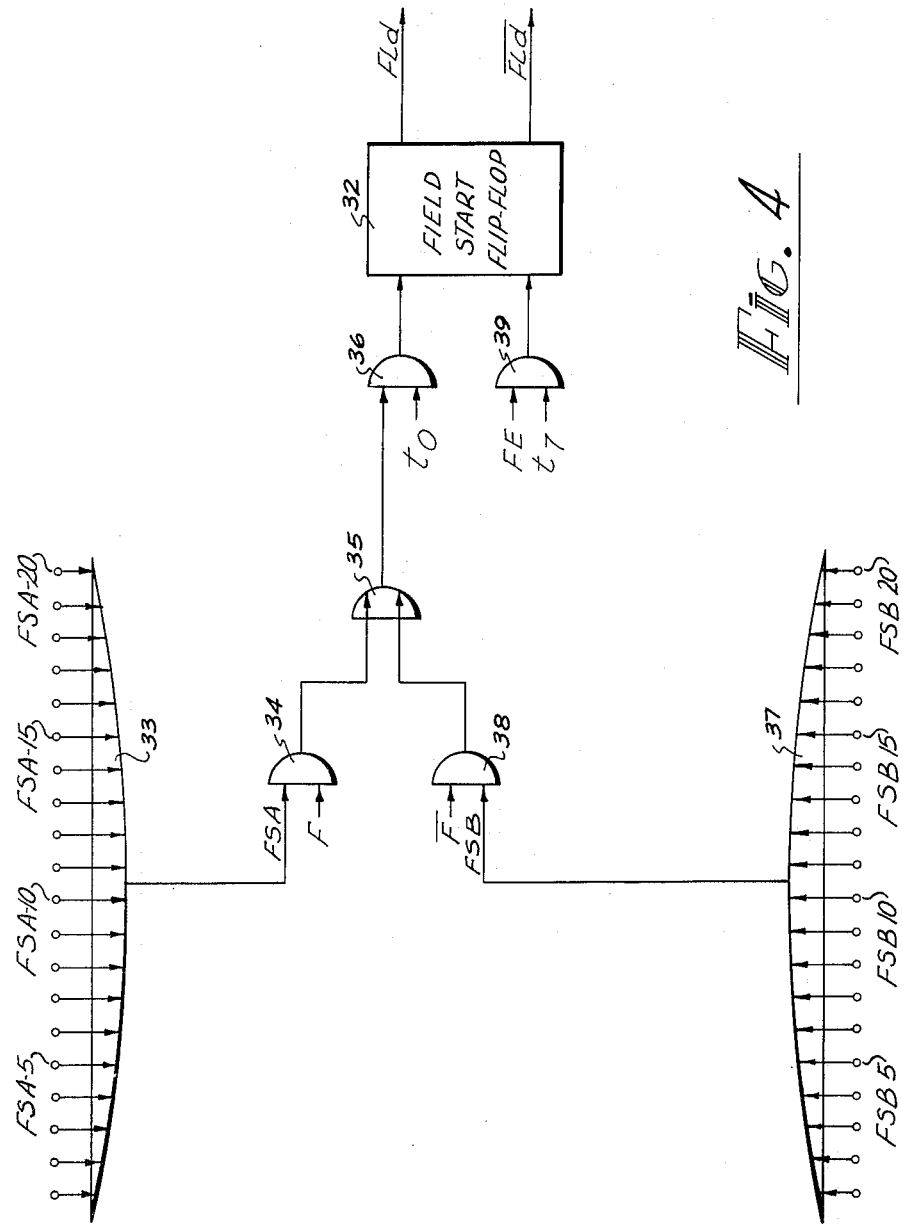

FIGURE 4 shows a schematic diagram of logic circuits for controlling Field Start flip-flop 32. The true output signal of Field Start flip-flop 32, which occurs when flip-flop 32 is in its set condition, is represented as FL$d$. The false output signal of flip-flop 32, which occurs when flip-flop 32 is in its reset condition, is represented as $\overline{FLd}$. When true signal FL$d$ is received by Computer 10, the computer receives information from Card Reader 11 and either stores or utilizes the information. When false signal $\overline{FLd}$ is received, the computer disregards information received from Card Reader 11. Computer 10 thus receives and utilizes only that information contained in a desired field of information.

The control of Field Start flip-flop 32 is as follows: OR-logic gate 33 receives an input signal from each of the FSA hubs. If the Format A section of Plugboard 18 is controlling the reading operation, a signal occurs at one of these FSA hubs when a column which begins a desired field of information is being read. OR-logic gate 33 then applies signal FSA to AND-logic gate 34 which was previously enabled by signal F from Format flip-flop 22 of FIGURE 3. The output signal of AND-logic gate 34 is applied to OR-logic gate 35, which in turn applies the signal to AND-logic gate 36. The other input to AND-logic gate 36 is timing signal $t_0$ from Read Timing Control Counter 17 of FIGURE 1. The simultaneous occurrence of these signals provides an output signal from AND-logic gate 36 and sets Field Start flip-flop 32, thereby providing the true output signal FL$d$.

When the card reading operation is under control of Format B of Plugboard 18, flip-flop 32 is set in the following manner: OR-logic gate 37, similar to OR-logic gate 33, has an input from each of the FSB hubs. The occurrence of a signal at any one of these hubs provides an output signal FSB from OR-logic gate 37, which is applied to AND-logic gate 38 which is enabled by the signal $\overline{F}$ from Format flip-flop 22 of FIGURE 3. The output signal of AND-logic gate 38 is applied to the input of OR-logic gate 35, whose output together with timing signals $t_0$ provides an output signal from AND-logic gate 36 and sets Field Start flip-flop 32.

Field Start flip-flop 32 is reset by the simultaneous occurrence of signal FE and timing signal $t_7$ from Read Timing Control Counter 17, which signals are applied to AND-logic gate 39, whose output resets flip-flop 32. The derivation of signal FE is explained in connection with FIGURE 5.

The state of Field Start flip-flop 32 may be represented by the following logic equations:

$$FLd = (FSA \cdot F + FSB \cdot \overline{F}) t_0$$
$$\overline{FLd} = FE \cdot t_7$$

Figure 5:
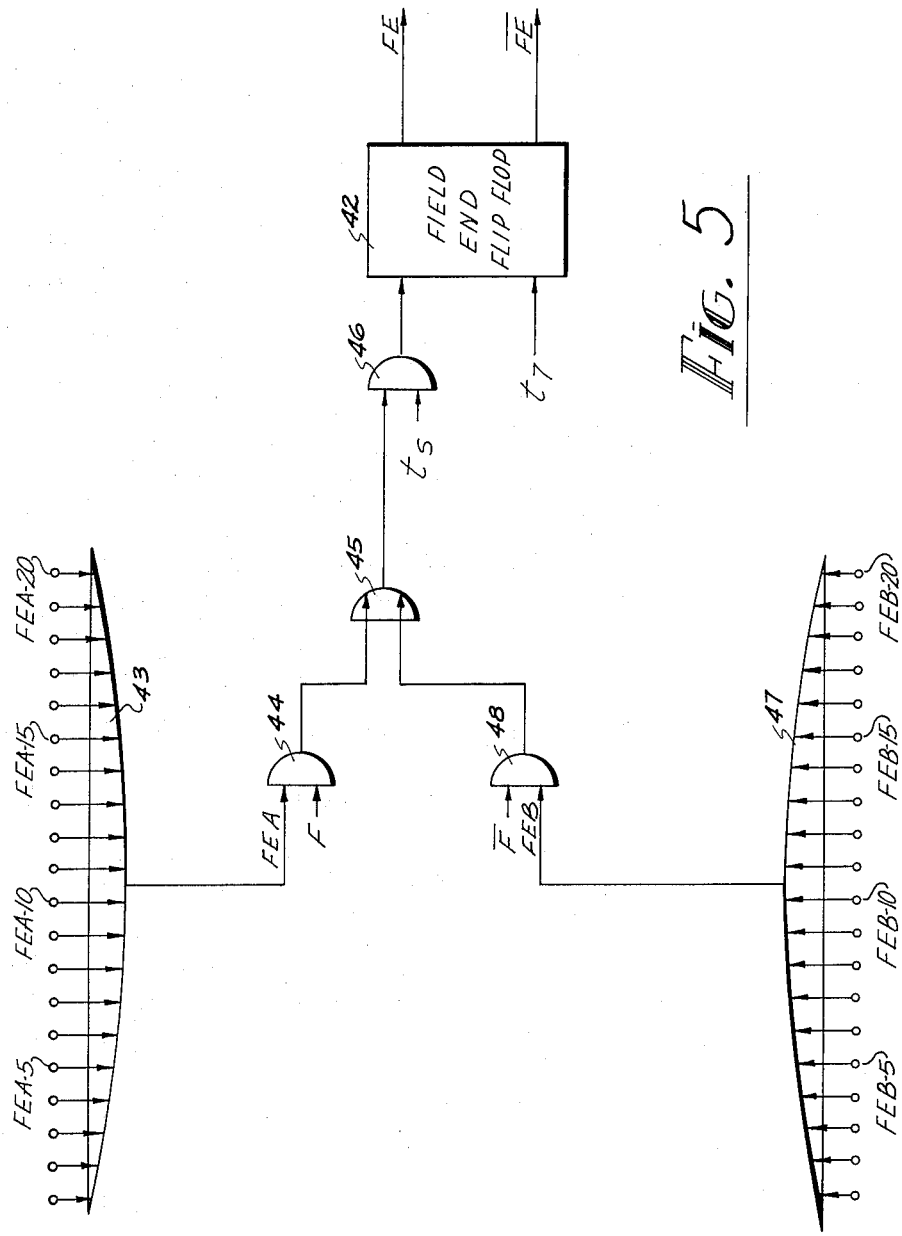

FIGURE 5 shows a schematic diagram for a circuit for controlling Field End flip-flop 42. The true output signal of flip-flop 42, which occurs when the flip-flop is in its set condition, is represented by FE. The false output signal of flip-flop 42, which occurs when the flip-flop is in its reset condition, is represented by $\overline{FE}$.

The control of Field End flip-flop 42 is as follows: OR-logic gate 43 and OR-logic gate 47 each have twenty input terminals, with the input terminals of OR-logic gate 43 being connected to the FEA hubs and the input terminals of OR-logic gate 47 being connected to the FEB hubs. The output signal from OR-logic gate 43 is connected to AND-logic gate 44 and the output signal of OR-logic gate 47 is connected to AND-logic gate 48. The other input signals for AND-logic gates 44 and 48 are F and $\overline{F}$, respectively. Thus, one or the other of AND-logic gates 44 and 48 is enabled depending on which format of Plugboard 18 is controlling the reading operation. The occurrence of a signal at one of the "Field End" hubs of the format controlling the reading operation allows one of the AND-gates 44 and 48 to pass a signal to OR-logic gate 45, whose output signal is applied to AND-logic gate 46. The simultaneous occurrence of this signal and timing signal $t_5$ from Read Timing Control Counter 17 of FIGURE 1 sets flip-flop 42. Flip-flop 42 is reset by timing signal $t_7$ from Read Timing Control Counter 17.

The state of Field End flip-flop 42 may thus be represented by the following logic equations:

$$FE = (FEA \cdot F + FEB \cdot \overline{F}) t_5$$
$$\overline{FE} = t_7$$

Figure 6:
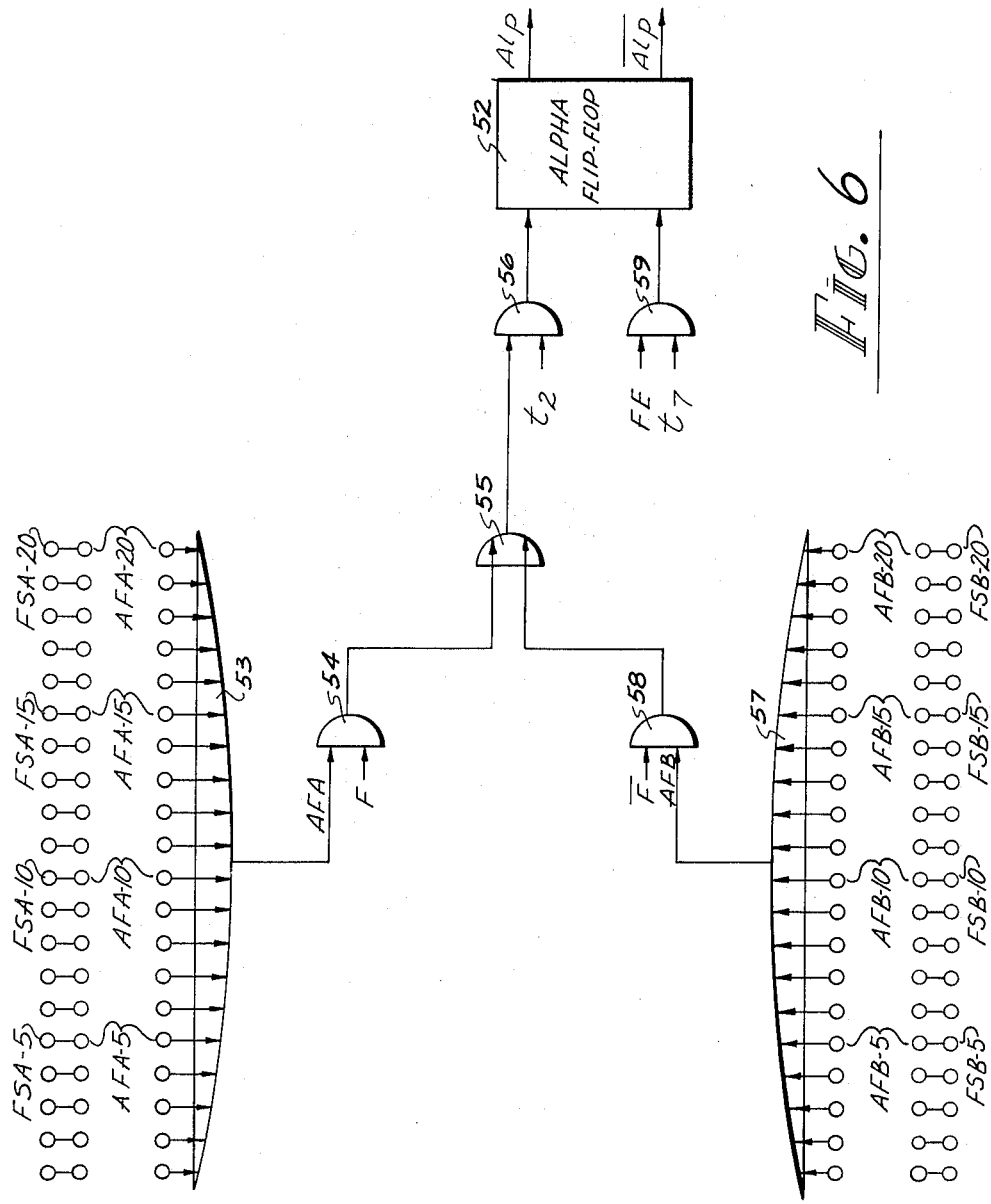

FIGURE 6 shows a schematic diagram of logic circuits for controlling Alpha flip-flop 52. Alpha flip-flop 52 provides a true signal A$lp$ when in its set condition and a false signal $\overline{Alp}$ when in its reset condition. The true signal A$lp$ indicates the particular field of information to be read the operator connects the particular pair of "Alpha in the alphanumeric code and the false signal $\overline{Alp}$ indicates that the particular field of information is to be read in the numeric code. These signals are supplied to Decoding Logic 13 and Computer 10 of FIGURE 1.

The control of Alpha flip-flop is as follows: OR-logic gates 53 and 57 each have twenty input terminals connected to a respective one of the "Alpha Field" hubs of Format A and Format B of Plugboard 18, respectively. The input terminals to these OR-logic gates are connected to those ones of the "Alpha Field" hubs which are not electrically connected to the corresponding "Field Start" hub for each pair of "Alpha Field" hubs. If a particular field of information is to be read in alphanumeric code the operator connects the particular pair of "Alpha Field" hubs corresponding to the "Field Start" hub connected to the "Card Column" hub corresponding to the column which begins the particular field of information. Thus, when a column of a punched card which begins a field of information to be read in alphanumeric code is at the reading station of Card Reader 11, OR-logic gate 53 or 57 provides signal AFA or AFB respectively to AND-logic gates 54 or 58 respectively. One or the other of these AND-logic gates is enabled by the signal F or $\overline{F}$, depending upon the state of Format flip-flop of FIGURE 3. The output signal from one of these AND-logic gates 54 and 58 is applied to OR-logic gate 55, whose output is applied to AND-logic gate 56. The other input signal to AND-logic gate 56 is timing signal $t_2$ from Read Timing Control Counter 17. Upon the occurrence of both input signals to AND-logic gate 56, Alpha flip-flop 52 is set and the true signal A$lp$ indicates to the Decoding Logic 13 and the Computer 10 that the particular field of information is to be read in the alphanumeric code.

Alpha flip-flop 52 is reset by the simultaneous occurrence of signal FE from FIGURE 5 and timing signal $t_7$ from Read Timing Control Counter 17, with these signals being applied to AND-logic gate 59. Thus, at the end of each field of information, Alpha flip-flop 52 is reset and the succeeding field of information is read in the numeric code unless the corresponding pair of "Alpha Field" hubs is again connected together.

The logic equations which define the state of Alpha flip-flop 52 are as follows:

$$Alp = (AFA \cdot F + AFB \cdot \overline{F}) t_2$$
$$\overline{Alp} = FE \cdot t_7$$

Figure 7:
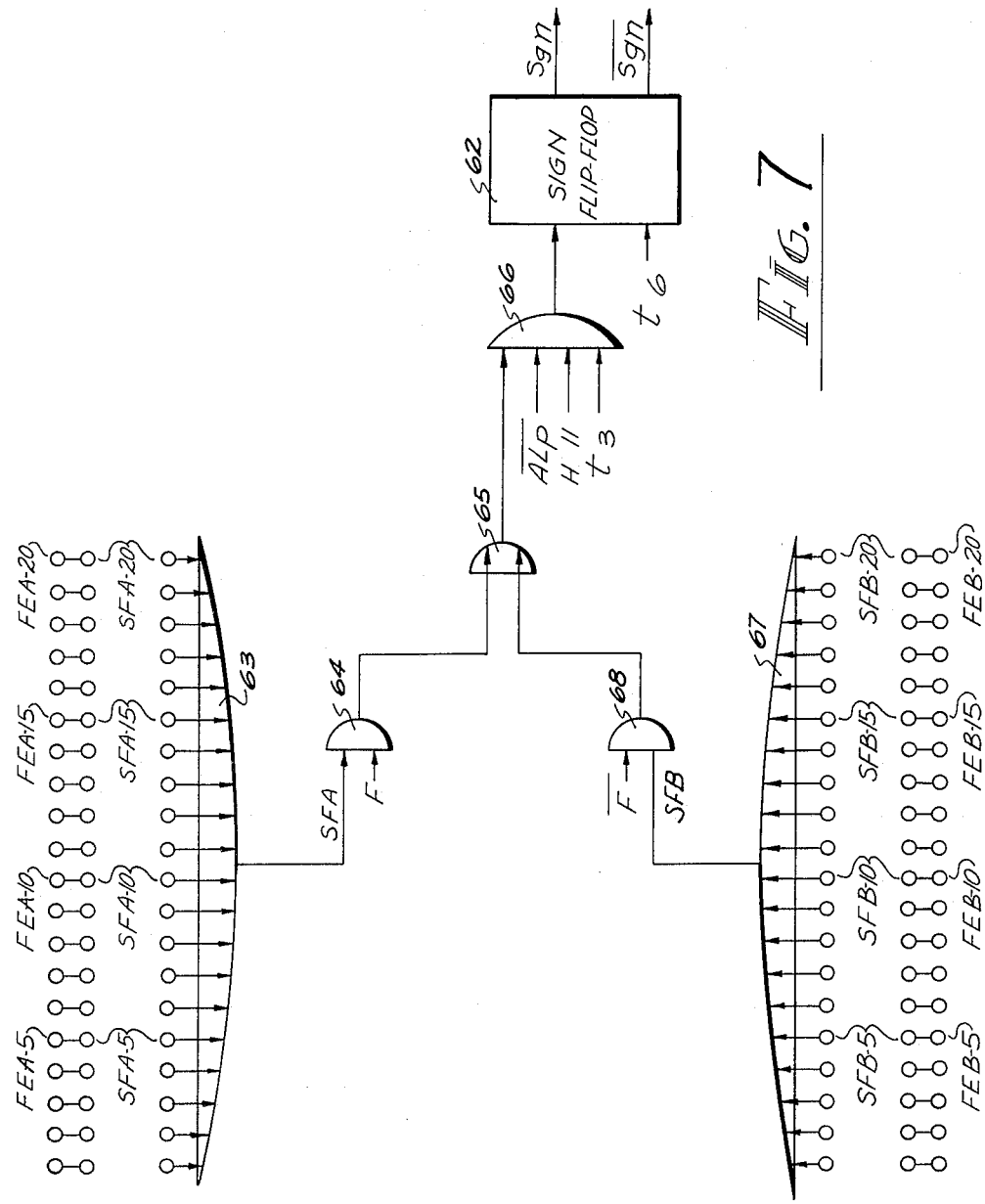

FIGURE 7 shows a schematic diagram for the logic circuit for controlling Sign flip-flop 62. The true output signal of Sign flip-flop 62, which occurs when flip-flop 62 is in its set condition, is indicated by $Sgn$, which indicates that the algebraic sign of the number in this field of information is negative. The false output signal of Sign flip-flop 62, which occurs when the flip-flop 62 is in its reset condition, is indicated by $\overline{Sgn}$, which indicates that the number in this field of information has a positive algebraic sign.

Sign flip-flop 62 is controlled as follows: OR-logic gates 63 and 67 each have twenty input terminals, each of which is connected to a respective one of the "Sign Field" hubs in Format A and Format B of Plugboard 18, respectively. In each case, the input terminals to OR-logic gates 63 and 67 are connected to those "Sign Field" hubs which are not connected to the "Field End" hubs. As was previously described, a signal occurs at one of the "Field End" hubs whenever a column is being read which is the final column of a field of information. If this particular field of information is being read in the numeric code, and it is desired to sample the field of information also for its algebraic sign, the pair of "Sign Field" hubs corresponding to the "Field End" hub used are connected through a jumper wire (not shown). OR-logic gate 63 thus supplies signal SFA to AND-logic gate 64 and OR-logic gate 67 applies signal SFB to AND-logic gate 68. Again, one or the other of these AND-logic gates 64 and 68 is enabled by the output signal of Format flip-flop 22 of FIGURE 3. One of AND-logic gates 64 and 68 applies a signal to OR-logic gate 65, which is passed therethrough to one of the input terminals of AND-logic gate 66. The other input signals to AND-logic gate 66 are $\overline{Alp}$, which indicates that the particular field of information is being read in the numeric code, H11, which indicates that the number in the field of information is of a negative algebraic sign, and $t_3$, which is from Read Timing Control Counter 17 of FIGURE 1. Upon the simultaneous occurrence of these four signals, a signal passes through AND-logic gate 66 and sets Sign flip-flop 62, thereby indicating that the number in the field of information has a negative algebraic sign. If no hole is punched in row eleven of the column being read, AND-logic gate 66 passes no signal, Sign flip-flop 62 remains reset and the number in the field of information is read with a positive algebraic sign. Sign flip-flop 62 is reset by timing signal $t_6$ from Read Timing Control Counter 17 of FIGURE 1.

The logic equations which define the state of Sign flip-flop 62 are as follows:

$$Sgn = (SFA \cdot F + SFB \cdot \overline{F}) \overline{Alp} \cdot H11 \cdot t_3$$
$$\overline{Sgn} = t_6$$

FIGURE 8 shows a schematic diagram of logic circuits for controlling End Card flip-flop 72. The true output signal of End Card flip-flop 72, indicated as $Ec$, occurs when flip-flop 72 is in its set condition and indicates that the column being read is the final column in the last field of information to be read from the particular punched card. The false output signal of End Card flip-flop 72, indicated as $\overline{Ec}$, occurs when flip-flop 72 is in its reset condition.

End Card flip-flop 72 is controlled as follows: AND-logic gates 73 and 76 are enabled by signals F and $\overline{F}$ respectively, from Format flip-flop 22 of FIGURE 3. Thus, one or the other of these AND-logic gates is always enabled, depending upon which format of Plugboard 18 is controlling the reading operation. The other input signals to AND-logic gates 73 and 76 are ECA and ECB, respectively, each of which receives a signal when the final column of the final field of information of its respective format is being read. The outputs of AND-logic gates 73 and 76 are applied to OR-logic gate 74, whose output is applied to one terminal of AND-logic gate 75. The other terminal of AND-logic gate 75 receives signal $t_5$ from Read Timing Control Counter 17 of FIGURE 1. The simultaneous occurrence of these signals sets End Card flip-flop 72 and indicates to Computer 10 that the final column of the final field of information to be read from the card has been read. End Card flip-flop 72 is reset by timing signal $t_6$ of Read Timing Control Counter 17.

The logic equations which define the state of End Card flip-flop 72 are as follows:

$$Ec = (ECA \cdot F + ECB \cdot \overline{F}) t_5$$
$$\overline{Ec} = t_6$$

The operation of the plugboard may be more clearly understood from the following example, which illustrates the use of Plugboard 18 to control the reading of information from a punched card in any one of three predetermined formats, depending upon the presence or absence of certain information on the punched card being read. FIGURE 9 shows a plugboard similar to that shown in FIGURE 2, except that all internal permanent electrical connections are omitted from the plugboard of FIGURE 9, and each of the electrical connections shown in FIGURE 9 is made by an external jumper wire connected between two selected hubs, with the exception of the connections between the associated pairs of "Format Change" and "End Card" hubs.

The Plugboard 18 is connected to read three fields of information from a punched card, with these fields of information being: (1) the field of information beginning at column five and ending at column twenty-five; (2) the field of information beginning at column thirty and ending at column fifty; and (3) the field of information beginning at column sixty and ending at column eighty. These three fields of information may be referred to respectively as field 1, field 2 and field 3.

The information in these fields of information is read in one of the three following formats, depending upon information stored in the punched card, these formats being:

(I) Field 1—numeric code with algebraic sign,
 Field 2—alphanumeric code,
 Field 3—alphanumeric code.

(II) Field 1—numeric code with algebraic sign,
 Field 2—numeric code without algebraic sign,
 Field 3—alphanumeric code.

(III) Field 1—numeric code with algebraic sign,
 Field 2—numeric code with algebraic sign,
 Field 3—numeric code with algebraic sign.

FIGURE 9 shows that hub CCA–5 is connected to one of the FCB–1 hubs, with the other FCB–1 hub being connected to hub FSA–5. As was previously explained, this causes the system to begin reading a field of information at column five of the punched card. As was also previously explained, if a punched hole appears in row twelve of column five, the Format B section of Plugboard 18 takes control of the reading operation and if no punched hole appears in this row, the Format A section of Plugboard 18 retains control. In either case, field 1 is read in numeric code with algebraic sign, since both hubs CCA–25 and CCB–25 are connected to a "Field End" hub whose corresponding "Sign Field" hubs are connected together.

If there was no punched hole in the twelfth row of the fifth column, Format A retains control and begins reading field 2 at column thirty, since hub CCA–30 is connected to hub FSA–8. Since the corresponding "Alpha Field" hubs AFA–8 are connected together, this field of information is read in alphanumeric code. Hub CCA–50 is connected to hub FEA–14, so the information from field 2 is terminated at column fifty of the punched card. The system begins reading the third field of information at column sixty since hub CCA–60 is connected to hub FSA–20. Again, this field of information is read in alphanumeric codes since the corresponding AFA–20 hubs are connected together. This field of information terminates at column eighty, which is connected to hub FEA–20 through the ECA hubs, thereby providing a signal as described in FIGURE 8 to indicate that the final field of information from the card has been read.

If there is a hole punched in the twelfth row of the fifth column, the control of the system is transferred to the Format B section of Plugboard 18. As was previously described, this section again causes the first field of information to be read in numeric code with algebraic signs. However, it is now observed that hub CCB–30 is connected to hub FSB–5 through the hubs FCA–3 and that the "Alpha Field" hubs corresponding to hub FSB–5 are not connected together. As has been previously described, this means that the information in the second field of information is read in the numeric code rather than the alphanumeric code and also that if a hole is punched in the twelfth row of the thirtieth column, the control of the reading operation is again transferred to Format A of Plugboard 18, while if there is no hole in this location, Format B retains control of the reading operation. In either case, this field of information is read in the numeric code. It is observed that hub CCB–50 is connected to hub FEB–10 and that the corresponding "Sign Field" hubs SFB–10 are connected together. This indicates that if Format B retains control of the reading operation, the numeric information in the field is read with an algebraic sign, which is positive if no hole appears in row eleven of column fifty and is negative if a hole appears in this location. It is observed that if the reading operation is transferred to Format A, the information is read in numeric code but without any sampling for algebraic sign, since the corresponding "Sign Field" hubs of Format A are not connected together.

If the control of the system returns to Format A at column thirty, the third field of information is read in alphanumeric code, as was previously discussed. However, if Format B retained control at column thirty, it is observed that hub CCB–60 is connected to hub FSB–16 and that the corresponding "Alpha Field" hubs are not connected together, therefore the third field of information is read in numeric code. It is further observed that hub CCB–80 is connected to hub FEB–20 through hubs ECB and that the corresponding "Sign Field" hubs SFB–20 are connected together, thereby indicating that the numeric information in the third field of information is sampled for algebraic sign in column eighty, in a manner previously described.

It is thus seen that the information in a particular punched card is read in the first previously described format if there is no hole punched in the twelfth row of the fifth column of the card, that it is read in the second previously described format if there is a hole punched in the twelfth row of both the fifth and thirtieth columns and that it is read in the third previously described format if there is a hole punched in the twelfth row of the fifth column but no hole punched in the twelfth row of the thirtieth column.

While the principles of the invention have now been made clear in an illustrative embodiment, there will be immediately obvious to those skilled in the art many modifications in structure, arrangement, proportions, the elements, materials, and components, used in the practice of the invention, and otherwise, which are particularly adapted for specific environment and operating requirements, without departing from these principles. The appended claims are therefore intended to cover and embrace any such modifications, only within the limits of the true scope and spirit of the invention.

What is claimed is:

1. In a system for reading information contained in an information bearing medium, the information contained in said medium being arbitrarily separable into any selected number of fields of information, the combination comprising: first means for providing a first signal denoting the beginning of predetermined fields of information, second means for providing a second signal for denoting the end of each of said predetermined fields of information, means for receiving said first and second signals and responsive thereto for accepting from said information bearing medium only that information contained in said predetermined fields of information, and third means for providing a third signal for denoting the end of the last field of information to be accepted from said medium.

2. In a system for reading information contained in an information bearing medium, the information contained in said medium being arbitrarily separable into any selected number of fields of information and being represented in a predetermined one of a plurality of codes, the combination comprising: first means for providing a first signal denoting the beginning of predetermined fields of information, second means for providing a second signal for denoting the end of each of said predetermined fields of information, third means associated with each respective field of information for providing a third signal denoting the code of the information in said respective field of information, and means for receiving said first and second signals and responsive thereto for accepting from said information bearing medium only that information contained in said predetermined fields of information.

3. In a system for reading information contained in an information bearing medium, the information contained in said medium being arbitrarily separable into any selected number of fields of information, the combination comprising: first means for providing a first signal denoting the beginning of predetermined fields of information, second means for providing a second signal denoting the end of each of said predetermined fields of information, third means associated with each respective field of information for providing a third signal denoting the algebraic sign of the information in said respective field of information, and means for receiving said first and second signals and responsive thereto for accepting from said information bearing medium only that information contained in said predetermined fields of information.

4. In a system for serially reading information contained in an information bearing medium, the information contained in said medium being arbitrarily separable into any selected number of fields of information and being represented in a predetermined one of a plurality of codes, the combination comprising: first means for providing a first signal denoting the beginning of predetermined fields of information, second means for providing a second signal denoting the end of each of said predetermined fields of information, third means associated with each respective field of information for providing a third signal denoting the code of information in said respective field of information, fourth means associated with each of said respective fields of information responsive to information contained in said medium for providing a fourth signal denoting the algebraic sign of the information in said respective field of information, means for receiving said first and second signals and responsive thereto for accepting from said information bearing medium only that information contained in said predetermined fields of information, and fifth means for providing a fifth signal denoting the end of the last field of information to be read from said medium.

5. In a system for reading information contained in an information bearing medium, the combination comprising: a first means for providing a first signal for controlling the reading and decoding of information contained in said medium in a first predetermined manner and a second signal for controlling the reading and decoding of information contained in said medium in a second predetermined manner, and a second means responsive to information contained in said medium for controlling said first means to selectively provide one of said first and second signals.

6. In a system for reading information contained in an information bearing medium, the information contained in said medium being arbitrarily separable into any selected number of fields of information, the combination comprising: first means for controlling the reading of information contained in said medium in a first predetermined manner, second means for controlling the reading of information contained in said medium in a second predetermined manner, each of said first and second means comprising third means for providing a first signal indicating the beginning of predetermined fields of information and fourth means for providing a second signal indicating the end of each of said predetermined fields of information, means for receiving said third and fourth signals and responsive thereto for accepting from said information bearing medium only that information contained in said predetermined fields of information, and fifth means responsive to information contained in said medium for providing a third signal for controlling said first and second means to control the transfer of information contained in said medium.

7. In a system for reading information contained in a punched card, the information contained in said punched card being arbitrarily separable into any selected number of fields of information and being represented in a predetermined one of a plurality of codes, the combination comprising: first means for controlling the reading of information contained in said punched card in a first predetermined manner, second means for controlling the reading of information contained in said punched card in a second predetermined manner, each of said first and second means comprising third means for providing a first signal indicating the beginning of predetermined fields of information, fourth means for providing a second signal indicating the end of each of said predetermined fields of information, and fifth means associated with each respective field of information for providing a third signal denoting in which of said plurality of codes the information in said respective field of information is represented, means for receiving said first and second signals and responsive thereto for accepting from said punched card only that information contained in said predetermined fields of information, and sixth means responsive to information contained in said punched card for providing a fourth signal for controlling one of said first and second means to control the transfer of information contained in said punched card.

8. In a system for reading information contained in a punched card, the information contained in said punched card being arbitrarily separable into any selected number of fields of information, the combination comprising: first means for controlling the reading of information contained in said punched card in a first predetermined manner, second means for controlling the reading of information contained in said punched card in a second predetermined manner, each of said first and second means comprising third means for providing a first signal indicating the beginning of predetermined fields of information, fourth means for providing a second signal indicating the end of each of said predetermined fields of information, and fifth means associated with each respective field of information responsive to information contained in said punched card for providing a third signal for denoting the algebraic sign of the information in said respective field of information, means for receiving said first and second signals and responsive thereto for accepting from said punched card only that information contained in said predetermined fields of information, and sixth means responsive to information contained in said punched card for providing a fourth signal for controlling one of said first and second means to control the transfer of information contained in said punched card.

9. In a system for serially reading information contained in a punched card, the information contained in said punched card being arbitrarily separable into any selected number of fields of information and being represented in a predetermined one of a plurality of codes, the combination comprising: a plugboard, first means including said plugboard for providing a first signal for controlling the reading of information contained in said punched card in a first predetermined manner, second means including said plugboard for providing a second signal for controlling the reading of information contained in said punched card in a second predetermined manner, each of said first and second means comprising third means including said plugboard for providing a third signal indicating the beginning of predetermined fields of information, fourth means including said plugboard for providing a fourth signal indicating the end of each of said predetermined fields of information, fifth means including said plugboard associated with each respective field of information for providing a fifth signal denoting in which of said plurality of codes the information in said respective field of information is represented, sixth means including said plugboard associated with each respective field of information responsive to information contained in said punched card for providing a sixth signal denoting the algebraic sign of the information in said respective field of information, and seventh means including said plugboard for providing a seventh signal indicating the end of the last field of information to be read from said punched card, means responsive to said third and fourth signals for accepting from said punched card only that information contained in said predetermined fields of information, and eighth means including said plugboard responsive to information contained in said punched card for providing an eighth signal for controlling one of said first and second means to control the transfer of information contained in said punched card.

References Cited by the Examiner

UNITED STATES PATENTS

| | | | |
|---|---|---|---|
| 2,126,666 | 8/1938 | Rowley | 204—33 |
| 2,448,830 | 9/1948 | Robbins | 235—61.115 |
| 2,603,151 | 7/1952 | Bryce | 235—61.115 |
| 2,615,626 | 10/1952 | Luhn | 235—61.111 |

ROBERT C. BAILEY, *Primary Examiner.*

MALCOLM A. MORRISON, *Examiner.*

G. D. SHAW, *Assistant Examiner.*